United States Patent
Park

(10) Patent No.: US 8,045,091 B2
(45) Date of Patent: Oct. 25, 2011

(54) BACKLIGHT UNIT AND DISLAY DEVICE HAVING THE SAME

(75) Inventor: Jun Seok Park, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 266 days.

(21) Appl. No.: 12/514,599

(22) PCT Filed: Dec. 20, 2007

(86) PCT No.: PCT/KR2007/006676
§ 371 (c)(1),
(2), (4) Date: May 13, 2009

(87) PCT Pub. No.: WO2008/082105
PCT Pub. Date: Jul. 10, 2008

(65) Prior Publication Data
US 2010/0026928 A1   Feb. 4, 2010

(30) Foreign Application Priority Data
Dec. 29, 2006   (KR) .................. 10-2006-0138963

(51) Int. Cl.
*G02F 1/1335* (2006.01)

(52) U.S. Cl. ............... 349/61; 349/56; 349/62; 349/67

(58) Field of Classification Search ........... 349/56, 349/61, 62, 67
See application file for complete search history.

(56) References Cited

U.S. PATENT DOCUMENTS

| | | |
|---|---|---|
| 6,473,554 B1 | 10/2002 | Pelka et al. |
| 2006/0103774 A1 | 5/2006 | Han et al. |
| 2006/0104080 A1 | 5/2006 | Kim et al. |
| 2006/0114694 A1 | 6/2006 | Cho et al. |
| 2007/0103908 A1 | 5/2007 | Tabito et al. |
| 2007/0211205 A1 | 9/2007 | Shibata |
| 2008/0117356 A1 | 5/2008 | Oku et al. |
| 2009/0303411 A1* | 12/2009 | Kawato et al. .......... 349/61 |
| 2010/0208159 A1* | 8/2010 | Oan .................. 349/58 |

FOREIGN PATENT DOCUMENTS

| | | |
|---|---|---|
| EP | 1 925 971 A2 | 5/2008 |
| JP | 2005-159082 A | 6/2005 |
| JP | 2006-49098 A | 2/2006 |
| JP | 2006-58487 A | 3/2006 |
| JP | 2006-339004 A | 12/2006 |
| JP | 2006-349796 A | 12/2006 |
| KR | 10-2005-0122987 A | 12/2005 |
| KR | 10-2006-0054809 A | 5/2006 |
| KR | 10-2006-0059479 A | 6/2006 |

* cited by examiner

*Primary Examiner* — Jennifer Doan
(74) *Attorney, Agent, or Firm* — Birch, Stewart, Kolasch & Birch, LLP

(57) ABSTRACT

A backlight unit according to the embodiment comprises an LED module comprising an LED; a case supporting the LED module; a fixing part fixing the LED module to the case; a reflective sheet comprising an opening for exposing the LED on the LED module and the fixing part; and a guide pin fixing the reflective sheet to the case.

15 Claims, 2 Drawing Sheets

[Fig. 1]
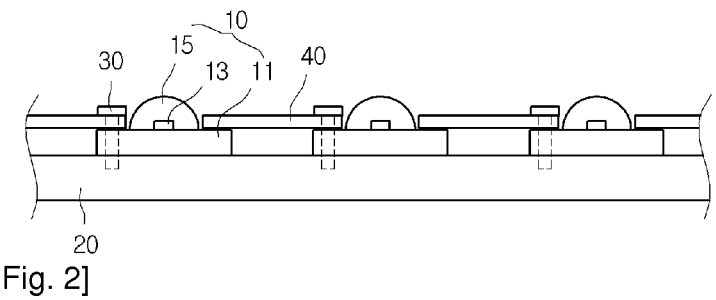
[Fig. 2]
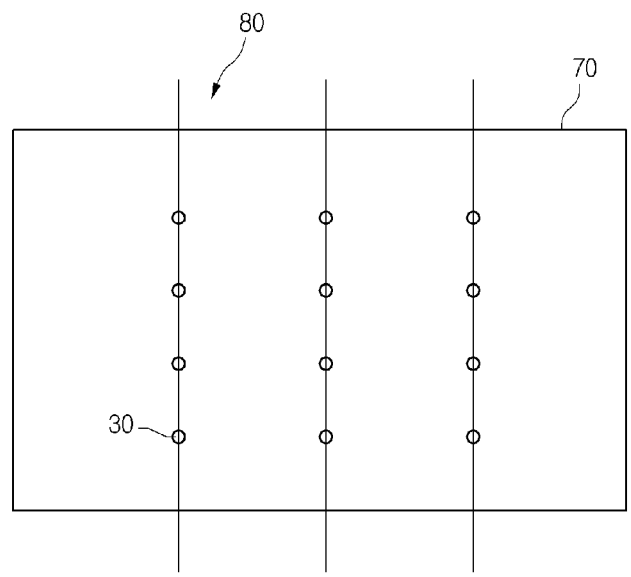
[Fig. 3]
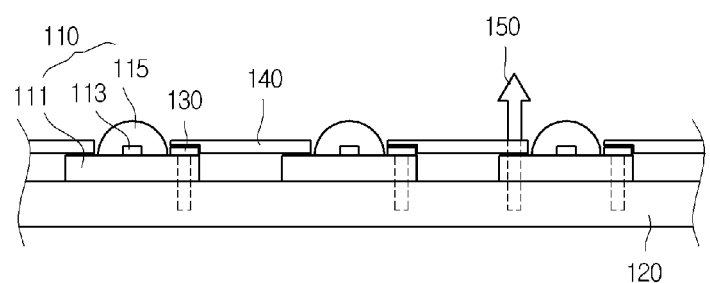
[Fig. 4]
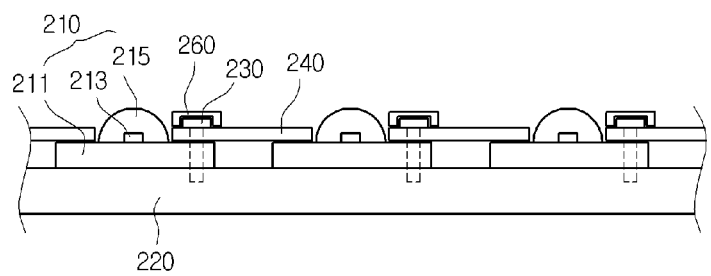

[Fig. 5]
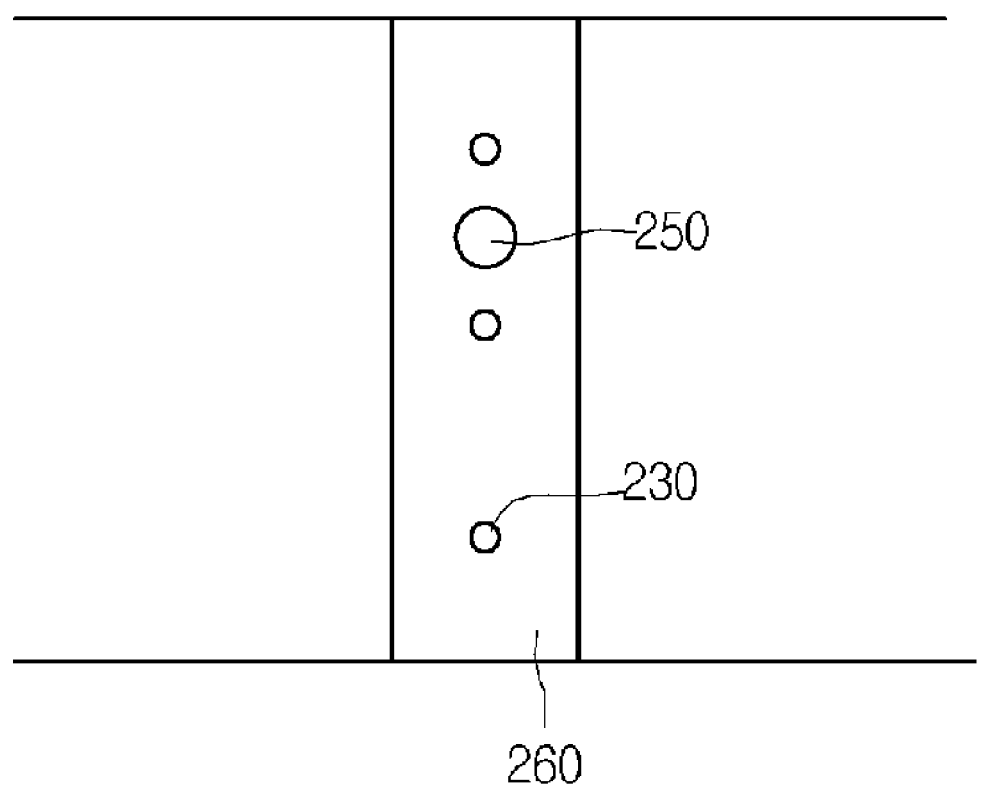

BACKLIGHT UNIT AND DISLAY DEVICE HAVING THE SAME

TECHNICAL FIELD

The embodiment relates to a backlight unit and a display device having the same.

BACKGROUND ART

FIG. 1 is a view schematically showing a conventional backlight unit.

As shown in FIG. 1, the conventional backlight unit comprises an LED module 10, a case 20, a fixing part 30 and a reflective sheet 40.

The LED module 10 comprises a printed circuit board 11, an LED 13 formed on the printed circuit board 11, and a mold part 15 formed on the LED 13.

The reflective sheet 40 reflects light, which is emitted from the LED 13, in the upward direction. The reflective sheet 40 is formed with an opening for exposing the LED 13. The reflective sheet 40 has reflectivity of 98% or more.

The fixing part 30 fixes the reflective sheet 40 and the LED module 10 to the case 20. The case 20 may be a cover bottom. An upper portion of the fixing part 30 is exposed on the reflective sheet 40. For instance, the fixing part 30 comprises a screw. In general, the fixing part 30 has reflectivity of about 60 to 70%.

Since there is a difference in reflectivity between the reflective sheet 40 and the fixing part 30, the conventional backlight unit represents non-uniform brightness distribution as shown in FIG. 2. FIG. 2 is a view showing a problem of the conventional backlight unit.

An optical sheet 70, such as a diffusion sheet, can be aligned on the backlight unit. Since the fixing part 30 has relatively low reflectivity, brightness of a region where the fixing part 30 is positioned may be lowered relative to other regions. Thus, a dark line may occur in the region where the fixing part 30 is positioned, causing non-uniform brightness distribution.

DISCLOSURE OF INVENTION

Technical Problem

The embodiment provides a backlight unit and a display device having the same, capable of improving brightness uniformity.

Technical Solution

A backlight unit according to the embodiment comprises an LED module comprising an LED; a case supporting the LED module; a fixing part fixing the LED module to the case; a reflective sheet comprising an opening for exposing the LED on the LED module and the fixing part; and a guide pin fixing the reflective sheet to the case.

A display device according to the embodiment comprises a backlight unit comprising an LED module comprising an LED, a case supporting the LED module, a fixing part fixing the LED module to the case, a reflective sheet comprising an opening for exposing the LED on the LED module and the fixing part, and a guide pin fixing the reflective sheet to the case; and a display unit displaying an image.

A backlight unit according to the embodiment comprises an LED module comprising an LED; a case supporting the LED module; a first reflective sheet comprising an opening for exposing the LED on the LED module; a fixing part fixing the LED module and the first reflective sheet to the case; a second reflective sheet on the fixing part; and a guide pin fixing the second reflective sheet to the case.

Advantageous Effects

The backlight unit and the display device having the same according to the embodiment can improve brightness uniformity.

BRIEF DESCRIPTION OF THE DRAWINGS

FIG. 1 is a view schematically showing a conventional backlight unit;

FIG. 2 is a view showing a problem of a conventional backlight unit;

FIG. 3 is a view schematically showing a backlight unit according an embodiment;

FIG. 4 is a view schematically showing a backlight unit according another embodiment; and FIG. 5 is a view showing a stack structure of first and second reflective sheets shown in FIG. 4.

MODE FOR THE INVENTION

In the description of the embodiments, it will be understood that when a layer (or film), a region, a pattern, or a structure is referred to as being "on" or "under" another substrate, another layer (or film), another region, another pad, or another pattern, it can be "directly" or "indirectly" on/under the other substrate, layer (or film), region, pad, or pattern.

Hereinafter, the embodiments will be described with reference to accompanying drawings.

FIG. 3 is a view schematically showing a backlight unit according an embodiment.

As shown in FIG. 3, the backlight unit according to the embodiment comprises an LED module 110, a case 120, a fixing part 130, a reflective sheet 140, and a guide pin 150.

The LED module 110 comprises a printed circuit board 111, an LED 113 disposed on the printed circuit board 111, and a mold part 115 formed on the LED 113. The LED 113 can be mounted on the printed circuit board 111. The LED module 110 may be formed with at least three LED, and disposed with at least one column and two rows.

The case 120 supports the LED module 110. The reflective sheet 140 is formed on the LED module 110 and the fixing part 130. The case 120 may be a cover bottom.

The guide pin 150 fixes the reflective sheet 140 to the case 120. The guide pin 150 can support an optical sheet, such as a diffusion sheet mounted on the guide pin 150. The guide pin 150 has reflectivity substantially identical or similar to that of the reflective sheet 140. The guide pin 150 can be inserted into the case 120 or can extend by passing through the case 120.

The reflective sheet 140 reflects light emitted from the LED 113 in the upward direction. The reflective sheet 140 is formed with an opening for exposing the LED 113. The reflective sheet 140 represents reflectivity of 98% or more.

The fixing part 130 fixes the LED module 110 to the case 120. For instance, the fixing part 130 comprises a screw and represents reflectivity of 60 to 70%. The fixing part 130 can be inserted into the case 120 or can extend by passing through the case 120.

The fixing part 130 is positioned below the reflective sheet 140. Thus, the light reflected from the reflective sheet 140 in the upward direction may have uniform brightness.

A stepped portion can be formed in a predetermined region of the reflective sheet 140 in correspondence with the fixing part 130 such that a protrusion of the fixing part 130 can be inserted into the stepped portion of the reflective sheet 140. Thus, the reflective sheet 140 may have a flat upper surface even in the region corresponding to the fixing part 130.

In addition, a recess can be formed in a predetermined region of the reflective sheet 140 in correspondence with the fixing part 130 such that a protrusion of the fixing part 130 can be inserted into the recess portion of the reflective sheet 140. Thus, the reflective sheet 140 may have a flat upper surface even in the region corresponding to the fixing part 130.

The backlight unit having the above structure is applicable for various display devices requiring the light sources. For instance, the backlight unit can be used for a liquid crystal display device comprising a liquid crystal panel. The liquid crystal display device displays an image on a display unit comprising the liquid crystal panel by using the light provided from the backlight unit. Since the liquid crystal display device comprises the backlight unit providing the light having uniform brightness, the liquid crystal display device can display a high-quality image.

FIG. 4 is a view schematically showing a backlight unit according another embodiment, and FIG. 5 is a view showing a stack structure of first and second reflective sheets shown in FIG. 4.

As shown in FIGS. 4 and 5, the backlight unit of the embodiment comprises an LED module 210, a case 220, a fixing part 230, a first reflective sheet 240, a guide pin 250, and a second reflective sheet 260.

The LED module 210 comprises a printed circuit board 211, an LED 213 disposed on the printed circuit board 211, and a mold part 215 formed on the LED 213. The LED 213 can be mounted on the printed circuit board 211. The LED module 210 may be formed with at least three LED, and disposed with at least one column and two rows.

The case 220 supports the LED module 210. The case 220 may be a cover bottom. The first reflective sheet 240 is formed on the LED module 210 and has an opening for exposing the LED 213.

The fixing part 230 fixes the first reflective sheet 240 and the LED module 210 to the case 220. An upper portion of the fixing part 230 is exposed out of the upper surface of the first reflective sheet 240. For instance, the fixing part 230 comprises a screw and represents reflectivity of 60 to 70%. If the fixing part 230 is prepared as a screw, the upper portion of the fixing part 230 can be prevented from being exposed out of the upper surface of the first reflective sheet 240 by increasing fastening force of the fixing part 230. The fixing part 230 can be inserted into the case 220 or can extend by passing through the case 220.

The exposed fixing part 230 may cause non-uniform brightness. For this reason, the second reflective sheet 260 is formed on the fixing part 230. The second reflective sheet 260 may be formed with the same columns or rows of the fixing part 230.

The guide pin 250 fixes the second reflective sheet 260 to the case 220. The guide pin 250 can support an optical sheet, such as a diffusion sheet mounted on the guide pin 250. The guide pin 250 has reflectivity substantially identical or similar to that of the first and second reflective sheet 240 and 260.

The first and second reflective sheets 240 and 260 reflect light emitted from the LED 213 in the upward direction. The first reflective sheet 240 is formed with an opening for exposing the LED 213. The first and second reflective sheets 240 and 260 represent reflectivity of 98% or more.

A stepped portion can be formed in a predetermined region of the second reflective sheet 260 in correspondence with the fixing part 230 such that a protrusion of the fixing part 230 can be inserted into the stepped portion of the second reflective sheet 260. Thus, the second reflective sheet 260 may have a flat upper surface even in the region corresponding to the fixing part 230.

In addition, a recess can be formed in a predetermined region of the second reflective sheet 260 in correspondence with the fixing part 230 such that a protrusion of the fixing part 230 can be inserted into the recess portion of the second reflective sheet 260. Thus, the second reflective sheet 260 may have a flat upper surface even in the region corresponding to the fixing part 230.

The second reflective sheet 260 may have a thickness smaller than that of the first reflective sheet 240. The brightness distribution by the second reflective sheet 260 can be improved more than the second reflective sheet 260 is not exited.

The backlight unit having the above structure is applicable for various display devices requiring the light sources. For instance, the backlight unit can be used for a liquid crystal display device comprising a liquid crystal panel. The liquid crystal display device displays an image on a display unit comprising the liquid crystal panel by using the light provided from the backlight unit. Since the liquid crystal display device comprises the backlight unit providing the light having uniform brightness, the liquid crystal display device can display a high-quality image.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The backlight unit and the display device having the same according to the embodiment can improve brightness uniformity.

The invention claimed is:
1. A backlight unit comprising:
an LED module comprising an LED;
a case supporting the LED module;
a fixing part fixing the LED module to the case;
a reflective sheet comprising an opening for exposing the LED on the LED module; and
a guide pin fixing the reflective sheet to the case,
wherein the reflective sheet comprises a recess such that a protrusion of the fixing part is accommodated to the recess.

2. The backlight unit as claimed in claim 1, wherein the LED module comprises a printed circuit board, the LED on the printed circuit board, and a mold part on the LED.

3. The backlight unit as claimed in claim 1, wherein the reflective sheet reflects light emitted from the LED in an upward direction.

4. The backlight unit as claimed in claim 1, wherein the reflective sheet has reflectivity substantially identical to that of the guide pin.

5. The backlight unit as claimed in claim 1, wherein the LED module comprises at least three LED disposed with at least one column and two rows.

6. A display device comprising:
a backlight unit comprising an LED module comprising an LED, a case supporting the LED module, a fixing part fixing the LED module to the case, a reflective sheet comprising an opening for exposing the LED on the LED module, and a guide pin fixing the reflective sheet to the case; and
a display unit displaying an image,
wherein the reflective sheet comprises a recess such that a protrusion of the fixing part is accommodated to the recess.

7. The display device as claimed in claim 6, wherein the display unit comprises a liquid crystal panel.

8. A backlight unit comprising:
an LED module comprising an LED;
a case supporting the LED module;
a first reflective sheet comprising an opening for exposing the LED on the LED module;
a fixing part fixing the LED module and the first reflective sheet to the case;
a second reflective sheet on the fixing part; and
a guide pin fixing the second reflective sheet to the case,
wherein the LED module comprises a printed circuit board, the LED on the printed circuit board, and a mold part on the LED.

9. The backlight unit as claimed in claim 8, wherein the first and second reflective sheets reflect light emitted from the LED in an upward direction.

10. The backlight unit as claimed in claim 8, wherein the second reflective sheet comprises a stepped portion such that a protrusion of the fixing part is accommodated to the stepped portion.

11. The backlight unit as claimed in claim 8, wherein the second reflective sheet comprises a recess such that a protrusion of the fixing part is accommodated to the recess.

12. The backlight unit as claimed in claim 8, wherein the first and second reflective sheets have reflectivity substantially identical to that of the guide pin.

13. The backlight unit as claimed in claim 8, wherein the second reflective sheet has a thickness smaller than that of the first reflective sheet.

14. The backlight unit as claimed in claim 8, wherein the LED module comprises at least three LED disposed with at least one column and two rows.

15. The backlight unit as claimed in claim 8, wherein the second reflective sheet is formed with the same columns or rows of the fixing part.

* * * * *